(12) United States Patent
Eydelman et al.

(10) Patent No.: US 8,315,165 B2
(45) Date of Patent: Nov. 20, 2012

(54) SURVIVABLE AND RESILIENT REAL TIME COMMUNICATION ARCHITECTURE

(75) Inventors: Vadim Eydelman, Bellevue, WA (US); Sankaran Narayanan, Redmond, WA (US); Dhigha D. Sekaran, Redmond, WA (US); Mahendra D. Sekaran, Sammamish, WA (US); Bimal K. Mehta, Sammamish, WA (US); Amey Parandekar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/794,861

(22) Filed: Jun. 7, 2010

(65) Prior Publication Data

US 2011/0299387 A1    Dec. 8, 2011

(51) Int. Cl.
*G01R 31/08* (2006.01)
(52) U.S. Cl. .................. 370/230; 370/235; 709/203
(58) Field of Classification Search .......... 370/216, 370/218, 230, 235; 709/203, 227
See application file for complete search history.

(56) References Cited

U.S. PATENT DOCUMENTS

| | | | |
|---|---|---|---|
| 7,657,780 B2 * | 2/2010 | D'Souza et al. ............ | 714/4.1 |
| 2002/0124057 A1 | 9/2002 | Besprosvan | |
| 2007/0047571 A1 * | 3/2007 | Kandikonda et al. ......... | 370/449 |
| 2008/0013447 A1 * | 1/2008 | Lauber ......................... | 370/225 |
| 2009/0245098 A1 | 10/2009 | Baker et al. | |
| 2009/0245183 A1 | 10/2009 | Baker et al. | |
| 2011/0299387 A1 * | 12/2011 | Eydelman et al. ........... | 370/225 |

OTHER PUBLICATIONS

Han, et al., "A Primary-Backup Channel Approach to Dependable Real-Time Communication in Multihop Networks", Retrieved at <<http://ieeexplore.ieee.org/stamp/stamp.jsp?tp=&arnumber=656080>>, IEEE Transactions on Computers, vol. 47, No. 1, Jan. 1998, pp. 46-61.
Ellison, et al., "Survivable Network Systems: An Emerging Discipline", Retrieved at <<http://www.cert.org/research/97tr013.pdf>>, Technical Report CMU/SEI-97-TR-013, Nov. 1997, pp. 51.
"Data Protection and Recovery in the Data Center", Retrieved at <<http://download.microsoft.com/download/7/c/b/7cb5887a-d5c8-4db6-b776-aa2a1c5882cd/DataCenterMgtDataProtectionRecoveryWhitepaper_FINAL.pdf>>, Aug. 2008, pp. 9.
Song, et al., "On the Study of Multiple Backups and Primary-Backup Link Sharing for Dynamic Service Provisioning in Survivable WDM Mesh Networks", Retrieved at <<http://ieeexplore.ieee.org/stamp/stamp.jsp?tp=&arnumber=4588336>>, IEEE Journal on Selected Areas in Communications, vol. 26, No. 6, Aug. 2008, pp. 84-91.
"Disaster Recovery with Solaris Cluster", Retrieved at <<http://www.sun.com/software/whitepapers/javaenterprisesystem/avail_disaster_recovery.pdf>>, White Paper, Apr. 2007, pp. 18.
"Centralized Versus Distributed Unified Communications Systems", Retrieved at <<http://www.nortel.com/solutions/iptelephony/collateral/nn123860.pdf>>, Retrieved Date: Apr. 5, 2010, pp. 8.

* cited by examiner

*Primary Examiner* — Jung Park
(74) *Attorney, Agent, or Firm* — Turk IP Law, LLC

(57) ABSTRACT

Enhanced communication systems with various resiliency and survivability aspects are provided. Data center, cluster, network, and load balancer survivability are provided for seamless communication experience in case of data center, cluster, discovery infrastructure, or hardware load balancer failures. Call, data, and authentication survivability are provided through dynamic re-routing over alternative networks, continuous data replication, and alternative authentication mechanisms. Seamless failover is ensured through use of identical signaling protocols and data carried by protocols between primary and backup clusters. Voicemail resiliency is achieved by re-routing calls directed to voicemail over alternative paths such as PSTN connections.

19 Claims, 8 Drawing Sheets

SURVIVABLE AND RESILIENT REAL TIME COMMUNICATION ARCHITECTURE

BACKGROUND

As an alternative to Public Switched Telephone Network (PSTN) systems, cellular phone networks have proliferated over the last decades, where users with cellular phones have access to one or more networks at almost any location. Also a recent development is the wide spread use of Voice over IP (VOIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice calls, video communications, etc.). This technology is also referred to as unified communications (UC). A network of servers manages end devices capable of handling a wide range of functionality and communication while facilitating communications between the more modern unified communication network devices and other networks (e.g. PSTN, cellular, etc.).

Enhanced communication systems providing multi-modal communications operate in a similar fashion to (sometimes the same) data exchange networks where designated servers and their backups provide services (e.g. routing of calls). Session Initiation Protocol (SIP) is a commonly used communication protocol between components of such systems. Survivability is one of the critical requirements for enhanced communication systems. Communications may be interrupted if the data center goes out of service, one or more communication servers are taken out for planned or unplanned maintenance, or one or more inter-site Wide Area Network (WAN) links are down. Moreover, network failures including Domain Name System (DNS) failures, directory failures, authentication provider failures, and/or load balancing failures may cause interruptions, delays, and similar degradation of user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enhanced communication systems with various resiliency and survivability aspects. According to some embodiments, data center, cluster, and network survivability may be provided for a seamless communication experience in case of data center, cluster, or discovery infrastructure failures. According to other embodiments, call, data, and authentication survivability may be provided through dynamic re-routing over alternative networks, continuous data replication, and alternative authentication mechanisms. According to further embodiments, seamless failover may be ensured through use of identical signaling protocols and data carried by protocols between primary and backup clusters. According to yet other embodiments, voicemail resiliency may be achieved by re-routing calls directed to voicemail over alternative paths such as PSTN connections.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
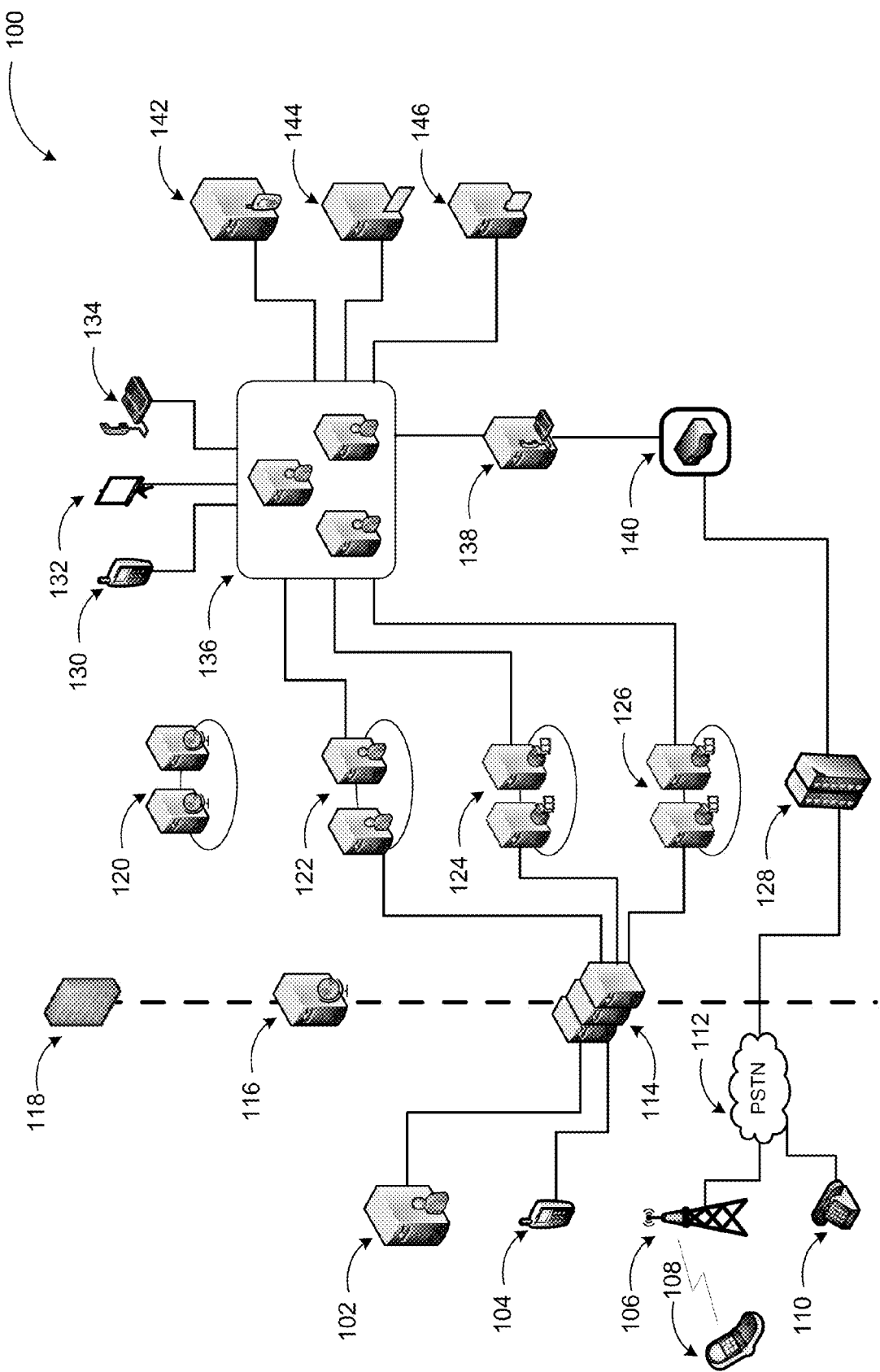
FIG. 1 is a diagram illustrating an example enhanced communications system such as a UC system, where embodiments may be implemented for providing a resiliency and survivability architecture.

As briefly described above, a call between two users may complete as long as one signaling path (direct or indirect) between them is available regardless of the state of the network in a system according to embodiments. If a user is connected to a server, and makes a call, outgoing calls may be successfully completed through redundant pathways and backup systems. Moreover, incoming and outgoing call treatment may be consistent with user's expectations regardless of which server (primary or backup) is providing service currently, as long as the user is connected to the server. Furthermore, user's data is protected against loss within the system as a result of one or more faults/outages described previously in a seamless manner to the user. User's data may include presence data such as a buddy list or contact groups, conferencing data such as conferences and associated meta-data, and routing data such as user's routing preferences. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing multimodal communication systems or redundancy systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "site" as used herein refers to a geographical location and may include data centers, branch offices, and similar communication subsystems. The term "call" refers to multi-modal communication sessions, examples of which are discussed below. Thus, a "call" is not limited to audio communications. Furthermore, the term cluster refers to a group of physical and/or virtual servers, which may provide the same service to a client in a transparent manner (i.e., the client sees a single server, while the cluster may have a plurality of servers).

FIG. 1 includes diagram 100 illustrating an example enhanced communications system such as a UC system, where embodiments may be implemented for providing a resiliency and survivability architecture. A unified communication system is an example of modern communication systems with a wide range of capabilities and services that can be provided to subscribers. A unified communication system is a real-time communications system facilitating email exchange, instant messaging, presence, audio-video conferencing, web conferencing, and similar functionalities.

In a unified communication ("UC") system such as the one shown in diagram 100, users may communicate via a variety of end devices 130, 132, 134, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through Private Branch Exchange (PBX) 128 to a Public Switched Telephone Network ("PSTN") 112. Further communications through PSTN 112 may be established with a telephone 110 or cellular phone 108 via cellular network tower 106. End devices 130, 132, 134 may include any type of smart phone, cellular phone, any computing device executing a communication application, a smart automobile console, and advanced phone devices with additional functionality.

The UC system shown in diagram 100 may include a number of servers performing different tasks. For example, edge servers 114 may reside in a perimeter network and enables connectivity through UC network(s) with other users such as remote user 104 or federated server 102 (for providing connection to remote sites). A Hypertext Transfer Protocol (HTTP) reverse protocol proxy server 116 may also reside along the firewall 118 of the system. Edge servers 114 may be specialized for functionalities such as access, web conferencing, audio/video communications, and so on. Inside the firewall 118, a number of clusters for distinct functionalities may reside. The clusters may include web servers for communication services 120, directory servers 122, web conferencing servers 124, and audio/video conferencing and/or application sharing servers 126. Depending on provided communication modalities and functionalities, fewer or additional clusters may also be included in the system.

The clusters of specialized servers may communicate with a pool of registrar and user services servers 136. The pool of registrar and user services servers 136 is also referred to as a data center. A UC system may have one or more data centers, each of which may be at a different site. Registrar servers in the pool register end devices 130, 132, and 134, and facilitate their communications through the system acting as home servers of the end points. User services server(s) may provide presence, backup monitoring, and comparable management functionalities. Pool of registrar and user services servers 136 may include a cluster of registrar servers. The registrar servers may act as backups to each other. The cluster of registrar servers may also have backup clusters in other data servers as described later.

Mediation server 138 mediates signaling and media to and from other types of networks such as a PSTN or a cellular network (e.g. calls through PBX 128) together with IP-PSTN gateway 140. Mediation server 138 may also act as a Session Initiation Protocol (SIP) user agent. In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

Additional components of the UC system may include messaging server 142 for processing voicemails and similar messages, application server 144 for specific applications, and archiving server 146. Each of these may communicate with the data center pool of registrar and user services servers 136. Various components of the system may communicate using protocols like SIP, HTTP, and comparable ones.

A UC system may provide a platform for multimodal communications. Clients in such a system are assigned home servers servicing communication requests from users. The home servers may be established as primary clusters with one or more backup clusters, each cluster having one or more physical/logic servers. While the primary/backup relationship of registrar clusters provides failover resiliency to users, a system according to embodiments may provide a number of additional survivability and resiliency measures. More detailed examples are discussed below.

While the example system in FIG. 1 has been described with specific components such as registrar servers, mediation servers, A/V servers, and similar devices, embodiments are not limited to these components or system configurations and can be implemented with other system configuration employing fewer or additional components. Functionality of enhanced communication systems with a resiliency and survivability architecture may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
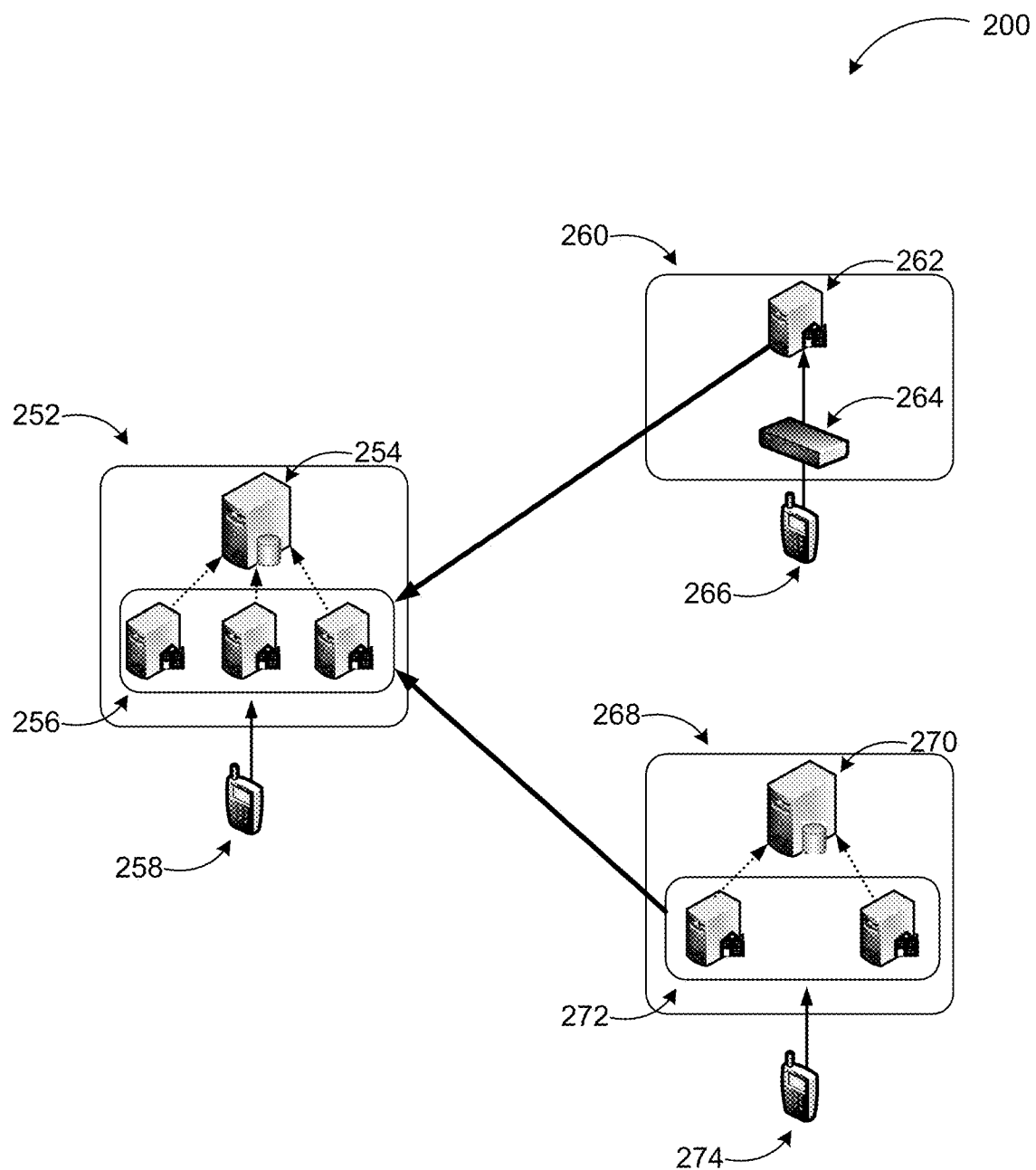
FIG. 2 is a conceptual diagram illustrating example primary and backup relationships between data centers and a branch office in an architecture according to embodiments.

FIG. 2 is a conceptual diagram illustrating example primary and backup relationships between data centers and a branch office in an architecture according to embodiments. As shown in diagram 200, an enhanced communication system may include one or more data centers 252, 268. Data centers 252 and 268 may be at different geographic sites and include at least one user services server 254, 270 providing presence, conferencing, and management functionalities in conjunction with one or more clusters 256, 272 of registrar servers providing registration and routing services to clients 258, 274 that are homed on respective clusters. Clients 258, 274, and 266 may be any communication application/device. For example, clients may include a communication application executed on a desktop computer, a wired or wireless handheld communication device, a cellular phone with application capability, and the like.

Clients may connect to the communication system through registrar servers on any of the data centers 252, 268. In addition, branch offices (e.g. 260) may provide an extension of the communication system to groups of users unable to directly connect to one of the data centers (e.g. because of geographic location, physical impairments in network connections, etc.). Branch offices may include varying numbers of equipment depending on their size and a number of clients they serve. For example, smaller branch offices may include a survivable branch appliance (SBA) 264, which may combine the functionalities of a registrar server 262 and a user services server in a single piece of equipment. Alternatively, branch offices may include one or more distinct servers or combinations of those devices.

In a system according to embodiments, each user may have a primary registrar pool (e.g. cluster 256 for client 258). Each registrar pool may have a backup registrar pool (e.g. cluster 256 for cluster 272). Branch user's primary registrar pool may be the SBA 264 of branch office 260. If a registrar server (e.g. 262) exists at the branch office, that registrar may be the home server. Backup registrar pool for the SBA 264 may also be data center cluster 256. A user's client may discover a registrar pool through a DNS server and be directed to primary and backup registrar pools. Backup registrar may check the assigned primary registrar regularly (e.g. heartbeat). If the primary does not respond within configurable failover interval, the backup may start accepting client registrations.

One aspect of an enhanced communication system according to embodiments includes cluster survivability. A data center cluster (e.g. 256, 272) may be composed of a group of individual homogenous registrars that provide a single system image to the users that they service. Individual registrars may be taken out of service for maintenance or other reasons, and clients may failover to alternate registrars within the cluster. Dynamic rebalancing and cluster assignment algorithms may be employed to provide automatic backup of registrar servers within each cluster.

An enhanced communication system according to some embodiments may also provide authentication survivability. Clients (e.g. 258, 266, 274) may be enabled to authenticate with the registrar server even if traditional authentication providers such as NTLM or Kerberos become unavailable in the case of a data center outage. To provide authentication in case of data center outage, alternative authentication mechanisms such as an identifier based (e.g. PIN) or certificate based authentication mechanisms may be provided to achieve authentication survivability.

Another aspect of an enhanced communication system according to embodiments includes load balancer survivability. If a hardware load balancer is the front end of a cluster (256, 272) and the load balancer fails without having a standby, the cluster may go out of service. To mitigate this challenge, DNS-based load balancing may be leveraged and the load balancer eliminated as a single point of failure.

Figure 3:
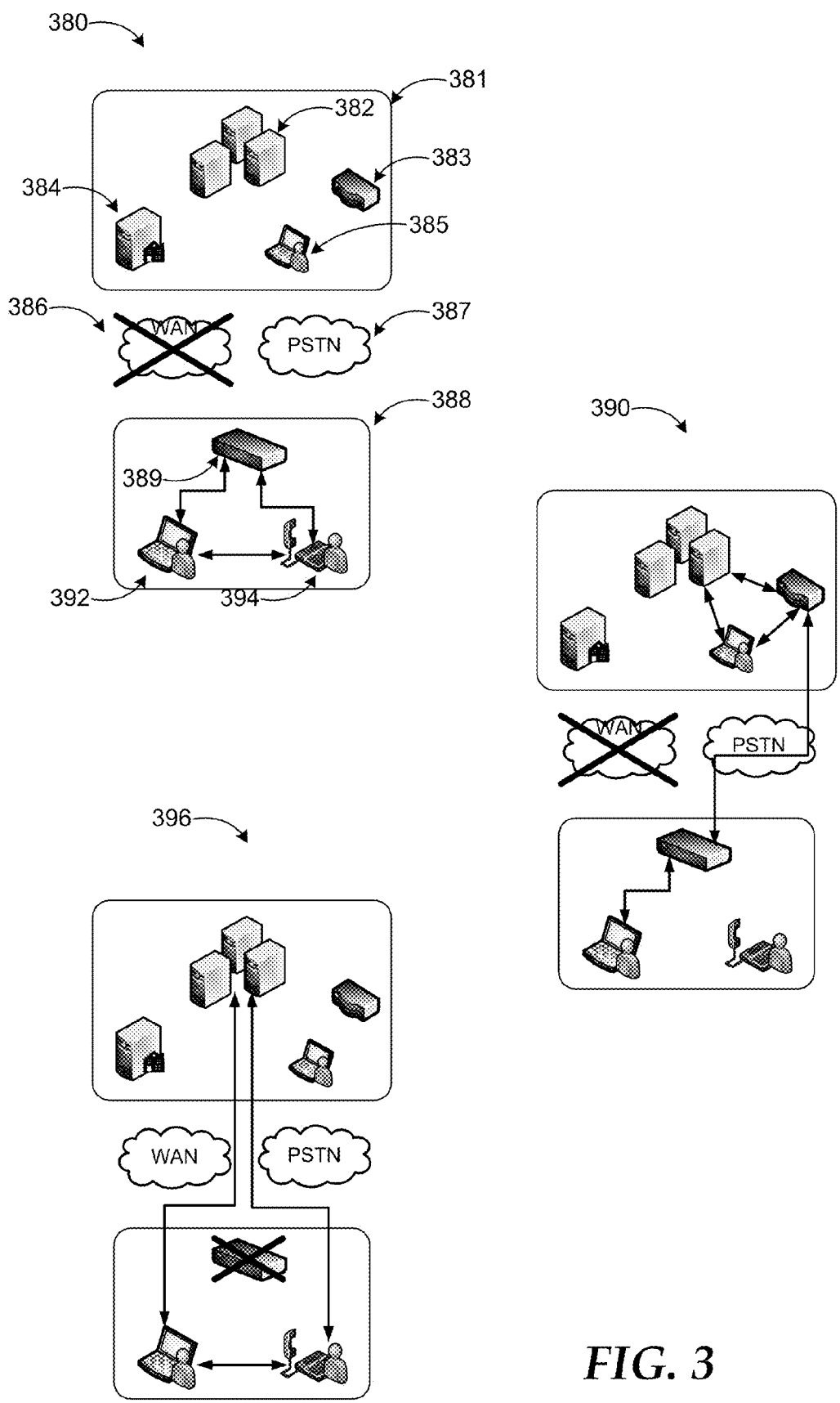
FIG. 3 is a conceptual diagram illustrating various examples of failure scenarios between a data center and a branch office that may be mitigated in a system according to embodiments.

FIG. 3 is a conceptual diagram illustrating various examples of failure scenarios between a data center and a branch office that may be mitigated in a system according to embodiments. Three example scenarios are shown in FIG. 3 based on a typical data center (e.g. 381). Data center 381 includes registrar pool 382, an edge server 384, gateway 383 for connection to PSTN and client 385 (directly connected to the data center).

According to scenario 380, WAN 386 between data center 381 and branch office 388 goes down, while PSTN 387 is still available. Intra-site communications within the branch office 388 may continue to be facilitated in various modalities directly between clients 392 and 394 or mediated by SBA 389. Audio conferencing may still be available via PSTN, but functionality such as presence or video conferencing may not be provided. According to scenario 390, a client in the branch office may communicate with the client connected to the data center through PSTN and the gateway of the data center. This means, however, calls may be limited to audio communications. The SBA may initiate the PSTN re-routing. According to scenario 396, the WAN and the PSTN are available, the SBA of the branch office goes down. In that case, clients of the branch office may register with the registrar pool of the data center as backup registrars and continue to communicate seamlessly bypassing the SBA. All functionality may be driven by the registrar pool of the data center, but there is no loss of functionality.

PSTN re-routing may be carried out under the following circumstances. Firstly, the primary cluster of the requested user may be down or unreachable and the backup cluster may also be unreachable or have no registered endpoints. Secondly, at least one of the called party's endpoints may be unable to accept the call due to bandwidth management constraints and none of the other endpoints may accept the call. PSTN re-routing may be performed in case of audio invites, requested user being homed in one of the system's clusters, the PSTN target number not terminating in the same site, or the user/phone number not being a "NOT FORWARD TO" number. Of course other comparable scenarios may be used to employ PSTN re-routing in case of WAN or data center outages.

The primary and backup clusters may check each other (e.g. heartbeat) and hence know the state of each other. A branch office registrar may be backed up by a data center registrar cluster. Moreover, the data center registrar cluster may be backed up by another data center registrar cluster. In the latter case, the failover may be reserved for users who are homed on the primary data center registrar cluster, and there may not be a transitive backup for branch office users.

A further aspect of an enhanced communication system according to embodiments includes call survivability. Calls cannot be routed across the sites if an inter-data center WAN link or an inter-site WAN link fails. In addition to providing registration survivability as described above, alternate routing may be performed in cases of link failures. A routing algorithm may try to find alternate paths (e.g. determining a sequence of backup clusters, employing heuristic methods, etc.). One example mechanism includes re-routing via PSTN. Although some of the features of a call may be lost (e.g. modalities other than audio), the call still survives providing consistency to the user.

Network survivability is yet another aspect of a system according to embodiments. If a DNS infrastructure is down, clients typically cannot discover servers within the system. For example, a branch office site separated by a WAN link from the data center needs to discover servers at the data center through a DNS server in the data center. In an enhanced communication system according to embodiments, an automatic server discovery mechanism such as SIP DHCP or SIP multicast may be employed enabling users to connect to the data center even if the WAN link between the data center and the branch office is severed.

Failovers may be rendered seamless and transparent to the user in a system according to embodiments. To achieve seamless failover, the signaling protocols and the data returned in the signaling protocols may be identical regardless of which server is providing the service (backup or primary). Thus, the user may not be aware that their client is being serviced by a primary cluster or a backup cluster.

Figure 4:
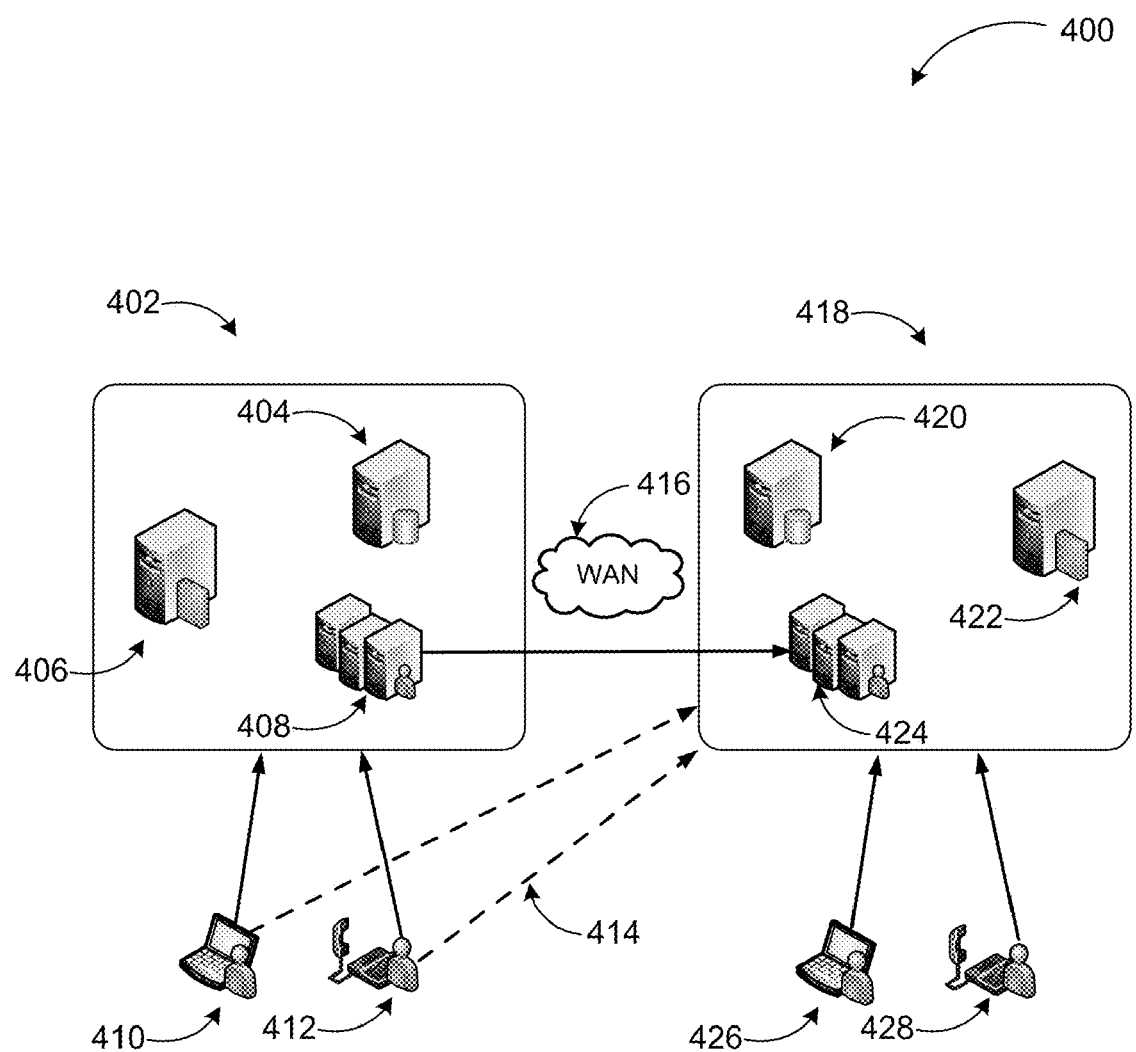
FIG. 4 illustrates data center voice resiliency through inter-site failover to a backup data center in an enhanced communications system according to embodiments.

FIG. 4 illustrates data center voice resiliency through inter-site failover to a backup data center in an enhanced communications system according to embodiments. As shown in diagram 400, an enhanced communication system may include two (or more) data centers (sites) 402 and 418 communicating via WAN 416. Each data center may include respective edge servers 406 and 422, registrar clusters 408 and 424, and archiving servers 404 and 420. The data centers may be designated each other's backups (or backups of other data centers). In case of catastrophic failure (the entire data center going down), users 410 and 412 of data center 402 may failover (414) to data center 418 and receive their services from data center 418 along with that data center's own users 426 and 428.

Registrar pools of the data centers 402 and 418 operate as separate systems. Client DNS request may discover one or more pools. The discovered pool may direct the client to primary and backup registrars. If the client's attempt to connect to primary registrar pool fails, the client connects to backup registrar. In case of failover a limited feature set may be available. Automatic failover may be enabled or disable and have a configurable failover interval. Failback may be automatic with a configurable failback interval. If primary data center cannot be restored, central management server may be restored in backup data center. Other services including presence and conferencing may be restored by moving users to the other registrar pool.

Thus, yet another aspect of an enhanced communication system according to embodiments includes data center survivability. Communication services may be maintained even if an entire data center goes out of service. Users may be associated with primary and backup clusters and they can be connected automatically to either the primary or the backup cluster depending on which one is available. The primary and backup clusters may implement failover/failback algorithms treating users as resources and using Session Initiation Protocol (SIP) as the communication protocol between servers and clients. Hence, if an entire data center goes out of service, clients may failover to an alternate data center and get service from the backup cluster.

Data survivability may be achieved in a system according to embodiments in cases of data center and/or cluster outages. User data such as routing, presence, and/or conferencing data are protected against data center or cluster outages. In addition, user's data may be configured to survive store outage, if a master store is used to store the data. A continuous replication, where the data is replicated to backup clusters, as well as to an external backup storage, may be employed to protect user data. The data may be made available when the user fails over or restored by the system automatically on demand. Necessary data may be replicated from the primary clusters to the backup clusters as well as to individual registrars within a cluster.

A yet further aspect of an enhanced communication system according to embodiments includes voicemail survivability. In a system according to some embodiments, a messaging server maybe installed only in the data center and not in branch offices. A caller may be enabled to deposit a voicemail for the called party (a subscriber of the enhanced communication system) even if the WAN from the branch office to the data center is unavailable and hence the messaging server in the data center is not reachable over data network(s). The registrar running on a survivable branch appliance (SBA) may provide registration and routing capabilities and along with the mediation server allow for voice features to continue working by leveraging the PSTN network as a fall-back transport when the WAN is unavailable. Specifically, the registrar may re-route unanswered calls over the PSTN to the messaging server in the data center when the WAN is unavailable. The registrar may also provide the ability for a user to retrieve voicemails through the PSTN during a WAN outage. The registrar may further queue missed call notifications during a WAN outage and upload to the messaging server when the WAN is restored.

According to an example scenario, a PSTN user, a branch office user, or another data center user may call subscriber@contoso.com. Subscriber may not be registered with the branch office registrar or answer the call. Subscriber may have his call forwarding rules set to direct unanswered calls to voicemail. The branch office registrar may route the call via PSTN to the messaging server for that site configured by the system administrator. The caller may be presented with a greeting. The caller may deposit the voicemail, which the subscriber may receive upon restoration of the WAN if the subscriber is in the branch office during the WAN outage. If the subscriber is a remote user signed on to the backup registrar in the data center, on the other hand, he may receive the voicemail immediately.

The example systems in FIG. 1 through 4 have been described with specific components such as registrar servers, communication servers, directory servers, presence servers, and the like. Embodiments are not limited to communication systems according to these example configurations. A survivable and resilient communication system according to embodiments may be implemented in configurations employing fewer or additional components and performing other tasks.

Figure 5:
FIGS. 5 and 6 illustrate an example communication application user interface in normal and survivability modes.
Figure 6:

FIGS. 5 and 6 illustrate an example communication application user interface in normal and survivability modes. An enhanced communication system according to embodiments may provide a variety of communication options through desktop, handheld, and similar device applications. Such applications may present user interfaces for facilitating communication in multiple modalities, and provide features such as contact management, presence management, and comparable ones. In a normal operation mode, when no significant network, cluster, or similar failures are present, all features of a communication application may be available through its user interface. In case of some failures such as primary cluster going down, a transparent transition to the backup cluster may occur, and the user interface may remain the same. In case of other failures such as WAN going down and communications being routed through PSTN, however, some of the features and/or communication capabilities may no longer be available. Thus, the user interface of the communication application may be automatically modified to reflect the current status of available features and/or modalities.

User interface 530 in FIG. 5 illustrates a communication application user interface in normal operation mode, when the WAN (and relevant data center(s)) are available. The user of the communication application may be identified with a photo, presence information, etc. (534) on the user interface. A control 532 may be provided for viewing calendar items. A number of communication options such as phone call, conference call, text message, and similar ones (536) may also be made available through icons. A list of contacts 538 categorized by default or user-defined rules along with presence information for each contact may be displayed on the user interface as well.

User interface 630 of FIG. 6 illustrates the scenario when the WAN is down and the communication application connects to the communication system via PSTN. Access to calendar items (632) is not available. The user of the communication application may still be identified with a photo and name (534), but presence information may not be available anymore. The presence information for the contacts is also not available. Indeed, a portion of the contact list 638 maintained by one of the servers at the data center may be completely removed, since that information is no longer available. Some of the communication modalities may not be available or available with changes (e.g. audio calls routed via PSTN). This may be indicated by hiding (or graying) some of the icons 636 associated with different communication options or providing an alert icon next to the communication option icons indicating more information is available.

Some of the features available when the WAN is down may include inbound and outbound PSTN calls, intra-site communications of any modality, inter-site calls by routing via PSTN, call hold/transfer/retrieve features, authentication, authorization, voicemail deposit by re-directing to messaging server via PSTN, voicemail retrieval via PSTN, simultaneous ringing, call detail records (CDR), and audio conferencing via PSTN. Features that may not be available in case of WAN failure may include inter-site data communications (e.g. text messaging, data sharing, application sharing, etc.), web-conferencing, video conferencing, presence based routing, modification of presence information, contacts lists, and group response/park operations.

A user interface for a communication application in an enhanced communication system according to embodiments is not limited to the example ones illustrated in FIGS. 5 and 6. Features and capabilities of an enhanced communication system and modifications in case of failures may be presented to a user employing a variety of user interface elements, textual/graphical/color/shading schemes, and forms using the principles described herein.

Figure 7:
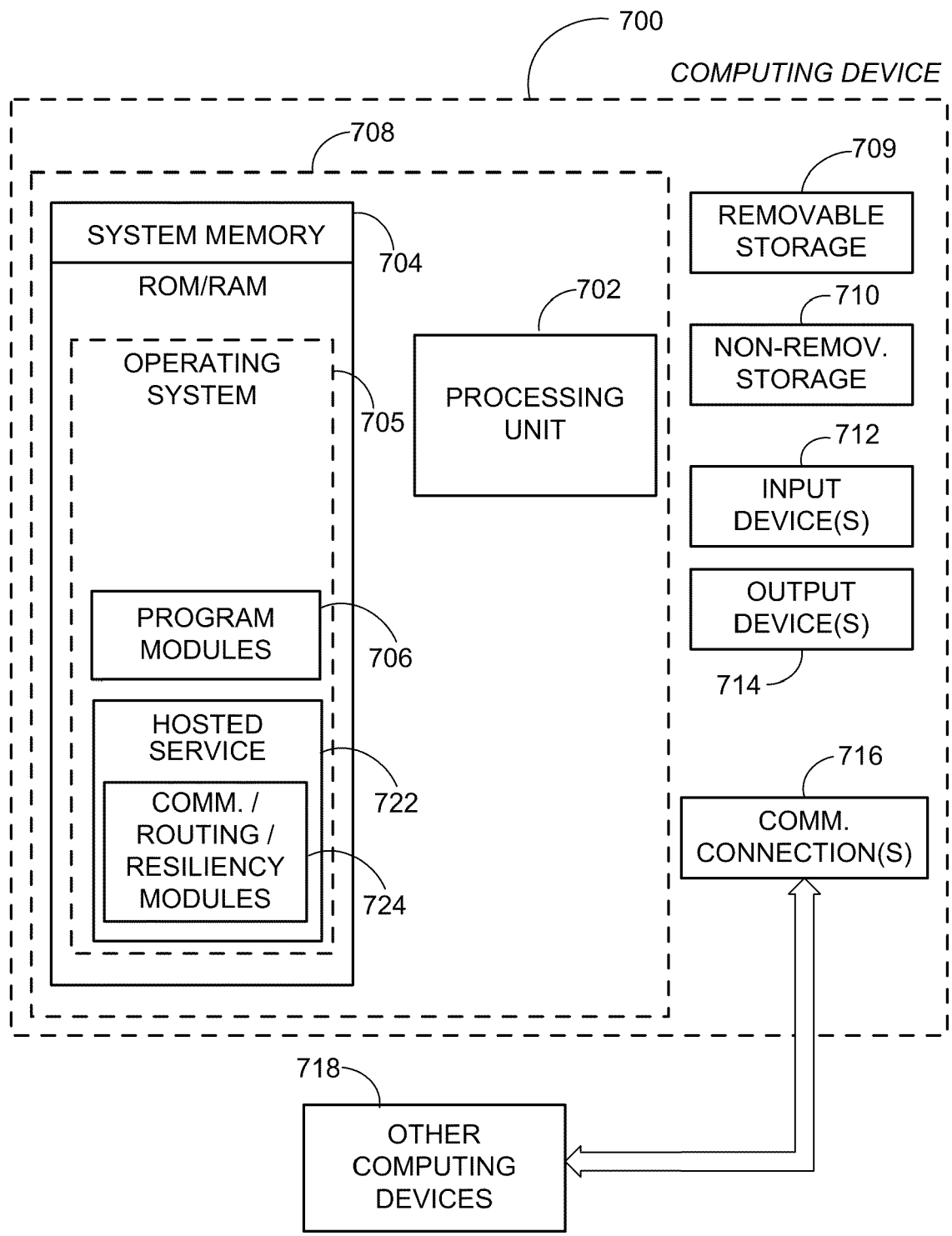
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server managing a communication application or service and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, hosted service 722, and various communication, routing, resiliency, etc. modules 724.

Hosted service 722 may facilitate multi-modal communications between users and provide associated services such as presence, conferencing, contact list management, and comparable ones. To provide a robust and reliable system, various aspects of the system may be arranged to be survivable and resilient as discussed above. Resiliency and survivability may be overseen and managed by individual modules of the service or inherently designed into the configurations of the components. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, other directory or policy servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
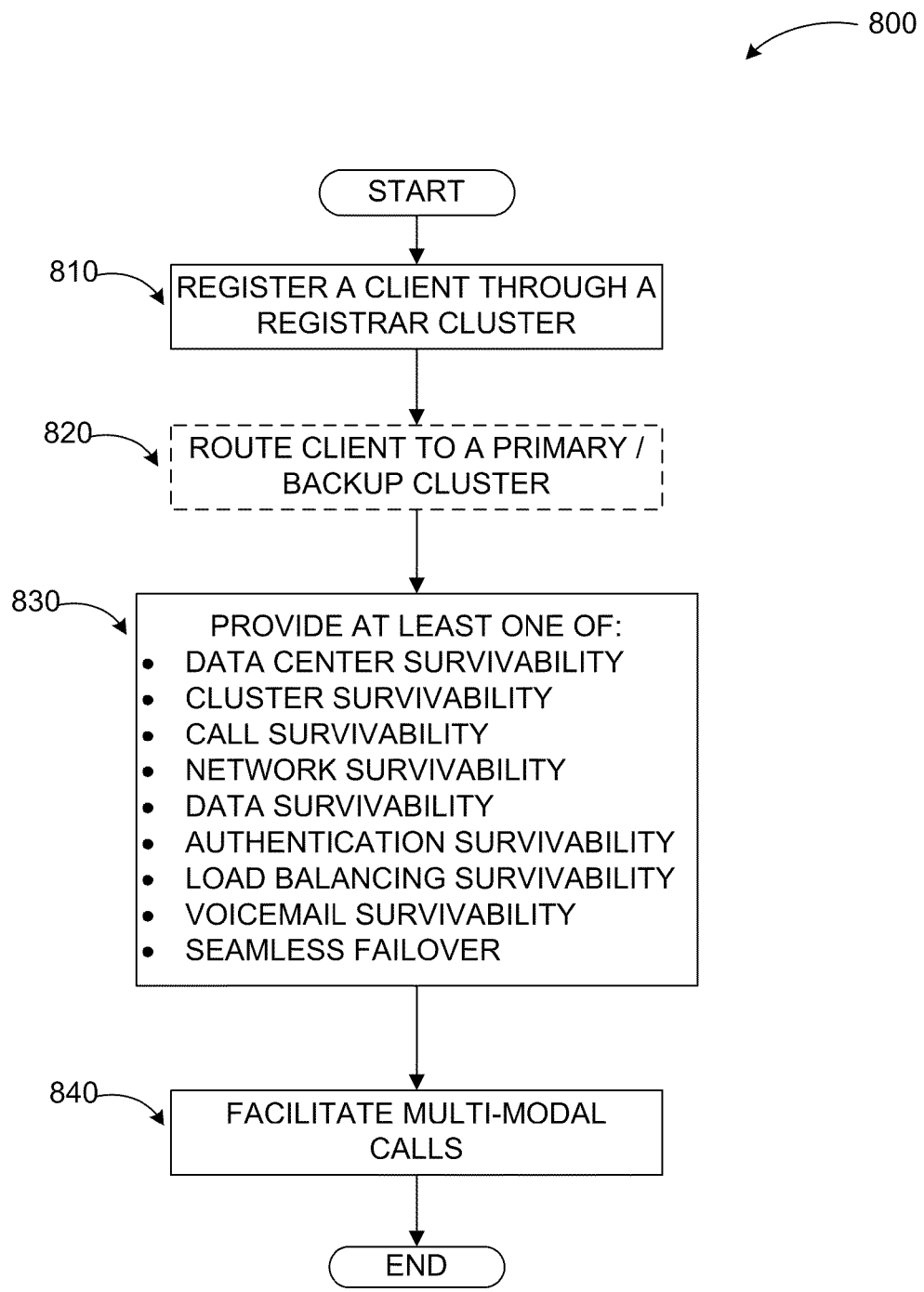
FIG. 8 illustrates a logic flow diagram for a process of providing enhanced communications with resiliency and survivability features according to embodiments.

FIG. 8 illustrates a logic flow diagram for a process 800 of providing enhanced communications with resiliency and survivability features according to embodiments. Process 800 may be implemented as part of an enhanced communication system.

Process 800 begins with operation 810, where a client is registered with the system through a registrar cluster or an SBA at a branch office. According to some embodiments, the receiving registrar may not be the assigned home server for a client. In that case, the client may be routed to its home server (primary or backup cluster) at optional operation 820.

Operation 830 represents various resiliency and survivability mechanisms that may be provided by the system for a robust and reliable communication environment. The example mechanisms may include data center survivability by assigning primary and backup registrar clusters at different data centers; cluster survivability by enabling clients to failover to an alternate registrar within the same cluster from their assigned home registrar in a transparent manner; call survivability by selecting an alternate inter-cluster call path or a PSTN call path; network survivability by enabling clients to discover a registrar cluster through a SIP DHCP discovery or a SIP multicast discovery; and data survivability by continuously replicating user and call associated data from a primary registrar cluster to a backup registrar cluster and an external backup data store such that the data is available upon client failover or system restoration.

The resiliency and survivability mechanisms provided at operation 830 may further include authentication survivability by employing an identifier or a certificate based authentication mechanism when an authentication server of the system is down; load balancing survivability by employing DNS based load balancing; voicemail survivability in case of data network failure between a data center and a branch office by re-routing calls directed to voicemail to a messaging server at the data center over PSTN; and seamless failover by using identical signaling protocols for communication with a client independent of a particular server communicating with the client.

At operation 840, multi-modal calls may be facilitated. At any time during the operations of the system, one or more of the survivability mechanisms may be activated in response to a component (e.g. data network, a server, a data center, etc.) going down.

The operations included in process 800 are for illustration purposes. Providing enhanced communication with resiliency and survivability according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for managing a resilient and survivable architecture of an enhanced communication system, the method comprising:
    enabling clients to register with a registrar cluster to receive communication services from the system, wherein the architecture of the system includes at least one data center of registrar clusters and a user services server, at least one branch office, and a plurality of function-specific servers;
    providing data center survivability by assigning primary and backup registrar clusters at different data centers;
    providing cluster survivability by enabling clients to failover to an alternate registrar within the same cluster from their assigned home registrar in a transparent manner;
    providing call survivability by selecting one of: an alternate inter-cluster call path and a Public Switched Telephone Network (PSTN) call path; and
    providing network survivability by enabling clients to discover a registrar cluster through one of: a Session Initiation Protocol (SIP) Dynamic Host Configuration Protocol (DHCP) discovery and a SIP multicast discovery.

2. The method of claim 1, further comprising:
    providing data survivability by continuously replicating user and call associated data from a primary registrar cluster to a backup registrar cluster and an external backup data store such that the data is available upon one of: client failover and system restoration.

3. The method of claim 1, further comprising:
    providing authentication survivability by employing one of an identifier and a certificate based authentication mechanism when an authentication server of the system is down;
    providing load balancing survivability by employing Domain Name Service (DNS) based load balancing; and
    providing transparent failover by using identical signaling protocols for communication with a client independent of a particular server communicating with the client.

4. The method of claim 3, wherein at least one of SIP and Hypertext Transport Protocol (HTTP) signaling protocols are employed for communication between the servers of the system and the client.

5. The method of claim 1, further comprising:
    providing voicemail survivability in case of data network failure between a data center and a branch office by re-routing calls directed to voicemail to a messaging server at the data center over PSTN.

6. The method of claim 5, wherein a survivable branch appliance (SBA) is configured to perform registration and routing services for a client connected to the branch office and re-route the calls directed to voicemail through a mediation server over the PSTN to the messaging server such that a user is enabled to retrieve voicemails over one of: the PSTN and a remote connection to the messaging server while the data network is down.

7. The method of claim 6, further comprising:
    queuing missed call notifications at the SBA during the data network outage; and uploading the queued notifications to the messaging server upon restoration of the data network.

8. The method of claim 6, further comprising:
enabling clients of the branch office to register through one of a primary registrar cluster and a backup registrar cluster of a data center if the SBA fails.

9. The method of claim 1, wherein the system is configured to facilitate multi-modal calls, and wherein at least a portion of available modalities and services associated with the multi-modal calls are restricted during data network outage.

10. The method of claim 1, wherein clients are enabled to discover a registrar cluster upon connection to the system and directed to one of an assigned primary registrar cluster and a backup registrar cluster.

11. An enhanced communication system providing multi-modal communication services with a resilient and survivable architecture, the system comprising:
a plurality of function-specific servers;
at least one branch office comprising a survivable branch appliance (SBA) configured to provide registration and routing services to clients associated with the branch office; and
a first and a second data centers, each data center comprising:
a user services server configured to provide presence, backup monitoring, and conferencing services; and
at least one registrar cluster comprising a plurality of homogeneous servers configured to provide registration and routing services to clients associated with respective data centers, wherein
backup registrar clusters in the second data center are assigned to primary registrar clusters in the first data center for data center survivability,
clients are enabled to failover to an alternate registrar server within the same cluster in a transparent manner for cluster survivability, and
user and call associated data are continuously replicated from a primary registrar cluster to a backup registrar cluster and an external backup data store such that the data is available upon one of: client failover and system restoration.

12. The system of claim 11, wherein the SBA is further configured to:
if a data network between the branch office and the data centers is down, re-route calls directed to voicemail over Public Switched Telephone Network (PSTN) to a messaging server at one of the first and second data centers such that a user is enabled to retrieve stored voicemails over one of: the PSTN and a remote connection to the messaging server while the data network is down; and
continue facilitating intra-site multi-modal communications between clients associated with the branch office while the data network is down.

13. The system of claim 11, wherein the branch office includes at least one registrar server, and the registration and routing services are shared between the SBA and the at least one registrar server depending on a number of clients associated with the branch office.

14. The system of claim 11, wherein call survivability is provided through selection of one of: an alternate inter-cluster call path and a PSTN call path;
network survivability is provided by enabling clients to discover a registrar cluster through one of: a Session Initiation Protocol (SIP) Dynamic Host Configuration Protocol (DHCP) discovery and a SIP multicast discovery; and
load balancing survivability is provided through Domain Name Service (DNS) based load balancing.

15. The system of claim 11, wherein intra-data center and intra-branch office multi-modal calls are facilitated during a data network outage and inter-site calls are provided through audio-only mode over the PSTN.

16. A computer-readable memory device with instructions stored thereon for managing a resilient and survivable architecture of an enhanced communication system, the instructions comprising:
registering clients with a registrar cluster in one of a data center and a branch office of the system to receive communication services from the system;
providing data center survivability by assigning backup registrar clusters to primary registrar clusters at different data centers;
providing cluster survivability by failing over clients to an alternate registrar server within the same cluster from their assigned home registrar in a transparent manner;
providing call survivability by selecting one of: an alternate inter-cluster call path and a Public Switched Telephone Network (PSTN) call path;
providing network survivability by enabling clients to discover a registrar cluster through one of: a Session Initiation Protocol (SIP) Dynamic Host Configuration Protocol (DHCP) discovery and a SIP multicast discovery;
providing voicemail survivability in case of data network failure between a data center and a branch office by re-routing calls directed to voicemail to a messaging server at the data center over PSTN; and
facilitating calls for users of the system, wherein at least one of the modalities of a call and a service associated with the call is restricted in response to one of: a data center outage and a data network outage.

17. The computer-readable memory device of claim 16, wherein the instructions further comprise:
during a data network outage, continuing to provide at least one from a set of: inbound/outbound PSTN calls, intra-site communications of multiple modalities, inter-site calls by routing via PSTN, call hold/transfer/retrieve features, authentication, authorization, voicemail deposit by re-directing to a messaging server at a data center via PSTN, voicemail retrieval via PSTN, simultaneous ringing, call detail records (CDR), and audio conferencing via PSTN.

18. The computer-readable memory device of claim 16, wherein the instructions further comprise:
providing a communication user interface to a user, the user interface including controls for at least one from a set of: different modalities of calls, contact information, and presence information.

19. The computer-readable memory device of claim 18, wherein the instructions further comprise:
restricting use of a portion of the user interface controls in a survivability mode.

* * * * *